(12) United States Patent
Sucharczuk et al.

(10) Patent No.: US 6,618,522 B2
(45) Date of Patent: Sep. 9, 2003

(54) ACTIVE EQUIPMENT PROTECTION METHODS AND APPARATUS

(75) Inventors: Guy Sucharczuk, Sunnyvale, CA (US); Wanda Wolodkowicz, Santa Clara, CA (US); Krzysztof Pradzynski, Santa Clara, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 0 days.

(21) Appl. No.: 10/263,141

(22) Filed: Oct. 2, 2002

(65) Prior Publication Data

US 2003/0035641 A1 Feb. 20, 2003

Related U.S. Application Data

(63) Continuation of application No. 09/658,420, filed on Sep. 8, 2000, now Pat. No. 6,501,871.

(51) Int. Cl.[7] .............................. G02B 6/28; H04J 14/00; H04J 14/08
(52) U.S. Cl. ..................... 385/24; 359/117; 359/136
(58) Field of Search ........................... 385/24, 31, 42, 385/47; 359/136, 137, 143, 165, 166, 173, 188, 117

(56) References Cited

U.S. PATENT DOCUMENTS

| | | | |
|---|---|---|---|
| 4,837,856 A | 6/1989 | Glista, Jr. .................... 455/601 |
| 5,023,942 A | 6/1991 | Goepel ........................ 455/601 |
| 5,809,187 A | 9/1998 | Peek, Jr. et al. ............... 385/24 |
| 6,088,141 A | 7/2000 | Merli et al. .................. 359/110 |
| 6,091,869 A | 7/2000 | Sundelin ...................... 385/24 |
| 6,301,404 B1 * | 10/2001 | Yoneyama .................... 385/24 |
| 6,351,582 B1 * | 2/2002 | Dyke et al. .................. 359/173 |
| 6,396,602 B1 | 5/2002 | Kaiser et al. ............... 359/117 |
| 6,477,288 B1 * | 11/2002 | Sato ........................... 385/24 |

OTHER PUBLICATIONS

"AC Series Broadband Couplers and Splitters for 850, 1300 and 1550 nm", catalog page, JDS Fitel, 1996.

* cited by examiner

*Primary Examiner*—Ricky Mack
*Assistant Examiner*—Alicia M Harrington
(74) *Attorney, Agent, or Firm*—Gray Cary Ware & Freidenrich, LLP

(57) ABSTRACT

Systems and methods are described for communications networks. A method, includes deploying a communication link, at least a portion of which is protected against active equipment failure, that includes a splitter-combiner communicatively coupled between a data drop/add device and a headend. The systems and methods provide advantages because a communication network can be protected, at least in-part, against active equipment (e.g., data drop/add device) failure, passive equipment (e.g., optical fiber) failure, and/or equipped for non-intrusive expansion of the network.

19 Claims, 3 Drawing Sheets

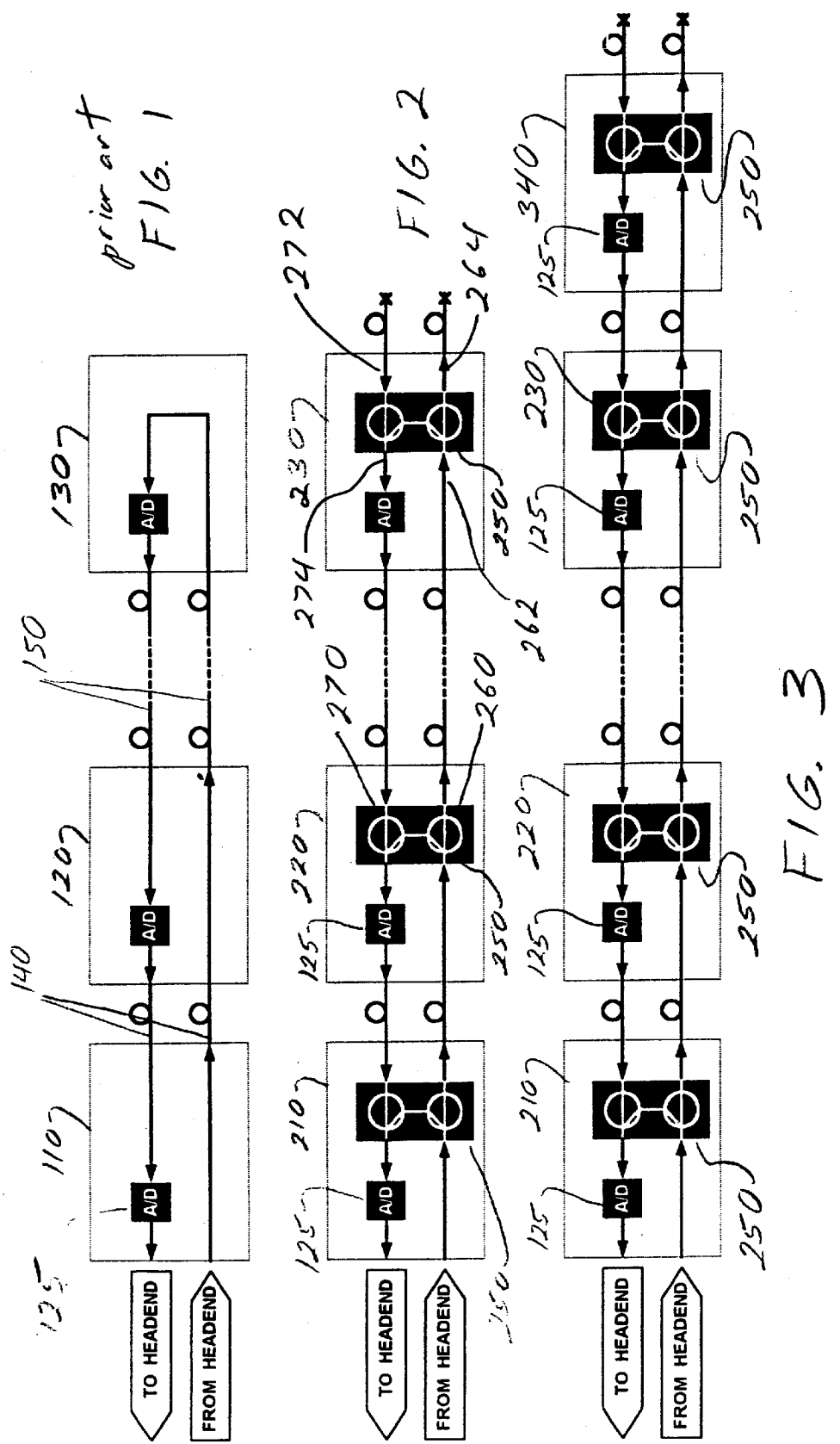

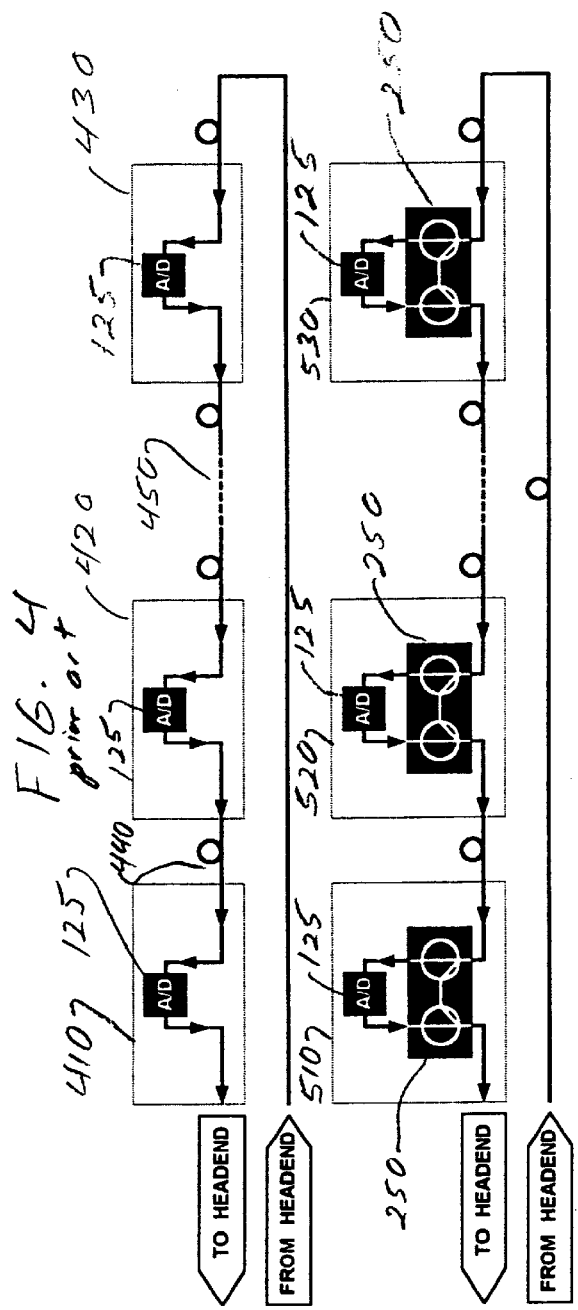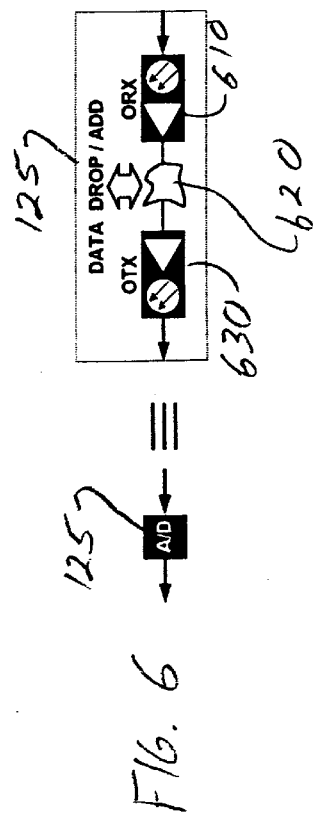

ACTIVE EQUIPMENT PROTECTION METHODS AND APPARATUS

RELATED APPLICATION

This application in a Continuation and claims the benefit of 35 U.S.C. 120 of the filing date of U.S. patent application Ser. No. 09/658,420, now U.S. Pat. No. 6,501,871, by inventors Guy Sucharczuk, Wanda Wolodkowicz, and Krzysztof Pradzynski, entitled "Active Equipment Protection Methods and Apparatus" filed on Sep. 8, 2000.

BACKGROUND OF THE INVENTION

1. Field of the Invention

The invention relates generally to the field of communication networks. More particularly, the invention relates to the use of splitter-combiners in ring communication networks.

2. Discussion of the Related Art

Communication nodes are designed and used for point to point communications over a network. A communications node is a transmitting and receiving (TX/RX) source.

Stringing a plurality of nodes together into a ring network is well known to those skilled in the art of communications. What is also well known is that an interruption in communication service can be both inconvenient and costly.

For instance, a conventional ring network is shown in FIG. 1, where a physical bus logical ring is depicted with three nodes 110, 120, 130 communicatively coupled to a headend. Each of the nodes 110–130 includes a data drop/add device 125. Node 110 is physically connected to node 120 with a pair of optical fibers 140. Node 120 is physically coupled to node 130 with a further pair of optical fibers 150. FIG. 1 indicates by dashed line segments that additional nodes may be positioned between nodes 120 and 130.

Another instance of a conventional ring network is shown in FIG. 4, where a ring architecture is depicted with three nodes 410, 420, 430 communicatively coupled to a headend. As above, each of the nodes 410–430 includes the data drop/add device 125. However, node 420 is physically connected to node 410 with a single optical fiber 440. Similarly, node 430 is physically coupled to node 420 with a single optical fiber 450. FIG. 4 indicates by dashed line segments that additional nodes may be positioned along fiber 450 between nodes 420 and 430.

A disadvantage of either of the instances shown in FIGS. 1 and 4 is that a break one of the optical fiber lines can prevent all of the nodes from bidirectionally communicating with the headend. Therefore, what is required is solution that provides the network with at least some protection in the event of a break in one of the fiber lines.

One approach to providing some protection in the event of a break in one of the fibers in the past has been to connect the nodes together with redundant parallel fibers. A break in one fiber can then be overcome through the use of a parallel redundant fiber. However, a disadvantage of this approach has been relatively high cost. Therefore, what is also needed is a solution that provides some protection in the event of a fiber break in a more cost-effective manner.

Another problem with this technology has been that expansion of a ring network requires interruption of communication services. Adding a node to the ring requires that the ring be broken, at least temporarily, so that the new node can be inserted into the ring. This break in the ring can prevent all of the nodes from bidirectionally communicating with the headend until the installation is complete. In many commercial settings, such a temporary interruption to install additional nodes is unacceptable. Therefore, what is also required is a solution that permits the network to be expanded without interrupting communication service.

Another problem with this technology has been failure of active equipment along the ring. If one of the data drop/add devices fails, all of the nodes can be prevented from bidirectionally communicating with the headend. Therefore, what is also required is a solution that provides protection in the event of active equipment failure.

Heretofore, the requirement(s) of protection in the event of a line break, expandability without interruption, and protection in the event of active equipment failure, referred to above have not been fully met. What is needed is a solution that addresses at least one, and preferably all, of these requirements. The invention is directed to meeting these requirements, among others.

SUMMARY OF THE INVENTION

A goal of the invention is to simultaneously satisfy the above-discussed requirements of network protection in the event of a line break, expandability without communications interruption, and network protection in the event of active equipment failure which, in the case of the prior art, are not satisfied, much less simultaneously satisfied. Another goal of the invention is to satisfying one or two of these requirements.

One embodiment of the invention is based on an apparatus, comprising a communications link, said communications link including a splitter-combiner communicatively coupled to a headend, said splitter-combiner including: a signal splitter communicatively coupled to a headend input and communicatively coupled to a downstream output; and signal combiner communicatively coupled to said signal splitter, communicatively coupled to an upstream input, and communicatively coupled to a headend output. Another embodiment of the invention is based on a method, comprising deploying a communications link at least a portion of which is protected against signal conductor failure, wherein deploying includes providing said communications link with a splitter-combiner that is communicatively coupled to a headend. Another embodiment of the invention is based on a method, comprising deploying a communications link with non-intrusive expansion capability, wherein deploying includes providing said communications link with a splitter-combiner communicatively coupled to a headend.

Another embodiment of the invention is based on an apparatus, comprising a communications link, said communications link including a splitter-combiner communicatively coupled to a headend, said splitter-combiner including: a signal splitter communicatively coupled to a headend input and communicatively coupled to a downstream output; and signal combiner communicatively coupled to said signal splitter, communicatively coupled to an upstream input, and communicatively coupled to a headend output; and a data drop/add device communicatively coupled to said downstream output and communicatively coupled to said upstream input. Another embodiment of the invention is based on an apparatus, comprising a communications link, said communications link including a first splitter-combiner communicatively coupled to a headend, said first splitter-combiner including: a first signal splitter communicatively coupled to a first headend input and communicatively coupled to a first downstream output; and a first signal combiner communicatively coupled to said first signal splitter, communicatively coupled to a first upstream input, and communicatively coupled to a first headend output; a data drop/add device communicatively coupled to said first downstream output and communicatively coupled to said first upstream input; a second splitter-combiner communicatively coupled between said first headend input and said headend, said second splitter-combiner including: a second signal splitter communicatively coupled to said headend and communicatively coupled to a second downstream output; and a second signal combiner communicatively coupled to said second signal splitter, communicatively coupled to a second upstream input, and communicatively coupled to said first headend input. Another embodiment of the invention is based on a method, comprising deploying a communication link, at least a portion of which is protected against active equipment failure, that includes a splitter-combiner communicatively coupled between a data drop/add device and a headend.

These, and other goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters (if they occur in more than one view) designate the same parts. It should be noted that the features illustrated in the drawings are not necessarily drawn to scale.

FIG. 1 illustrates a schematic view of a conventional physical bus, logical ring, appropriately labeled "PRIOR ART".

FIG. 2 illustrates a schematic view of a physical bus, logical ring with each node includes a splitter-combiner which can provide fiber protection and/or non-intrusive expansion, representing an embodiment of the invention.

FIG. 3 illustrates the physical bus, logical ring of FIG. 2 after the non-intrusive addition of a fourth node having a splitter-combiner, representing an embodiment of the invention.

FIG. 4 illustrates a schematic view of a conventional ring architecture, appropriately labeled "PRIOR ART".

FIG. 5 illustrates a schematic view of a ring architecture with each node including a splitter-combiner, which can provide active equipment protection, representing an embodiment of the invention.

FIG. 6 illustrates a more detailed schematic view of the A/D devices depicted in FIGS. 1–5, appropriately labeled "PRIOR ART."

DESCRIPTION OF PREFERRED EMBODIMENTS

Figure 7:
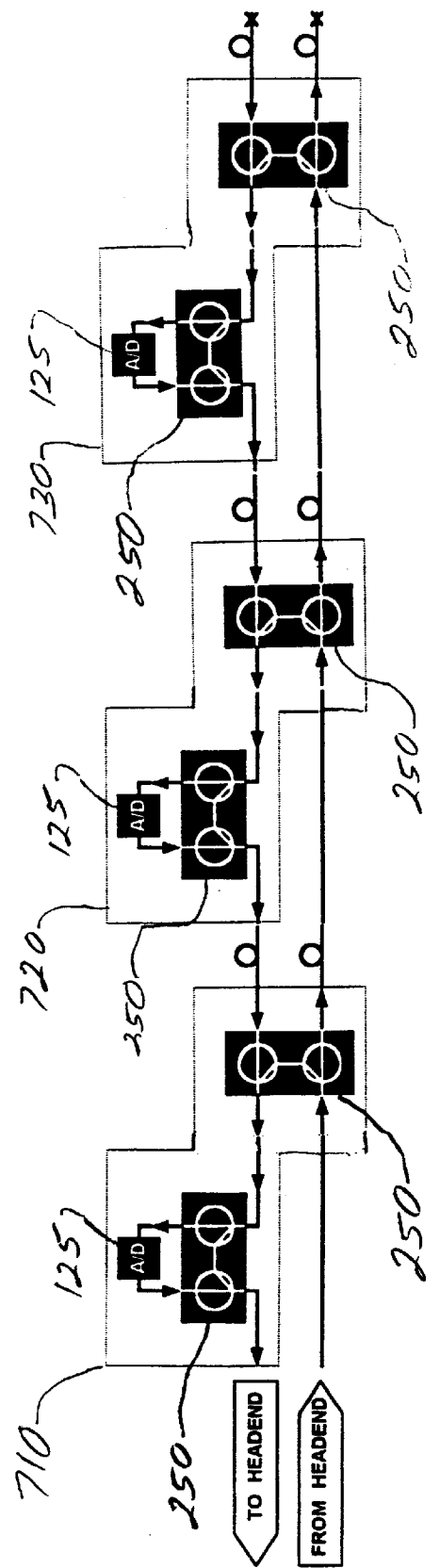
FIG. 7 illustrates a schematic view of a physical bus, logical ring architecture with each A/D node including two splitter-combiners, a first of which can provide active equipment protection and a second of which can provide fiber protection and/or non-intrusive expansion, representing a combined embodiment of the invention.

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The context of the invention includes communication networks. Expected applications include physical bus, logical rings. Expected applications also include ring architectures.

The invention can include placing a splitter in the transmitting path of a node and another splitter in the receiving path of the same node. In the case of optical signal splitting, the splitters can be readily commercially available fiber optic tap couplers. In the case of electrical signal splitting, the splitters can be simple Y branches. In either case, two of the splitters can be coupled together to compose a splitter-combiner. In this coupled configuration one of the splitters functions as a combiner. The splitter-combiner in-turn defines a shunt and a bypass.

By providing signals combined from the bypass with a gain of from approximately 10 dB to approximately 20 dB relative to signals combined from the shunt, a switching functionality is provided by the splitter-combiner. If a signal is present on the bypass, this bypass signal will be detected. If no signal (or only a very weak signal) is present on the bypass, the shunt signal will be detected. It is important to appreciate that signals being transmitted along the shunt are overwhelmed by signals being transmitted along the bypass, if the later are present.

The splitters that compose the splitter-combiner can be optical in the case of an optical communications network. Alternatively, these splitters can be electrical in the case of an electrical communications network. Further, these splitters could even be vibrational in the case of an acoustical communications network. Other types of splitters could be used.

Preferred embodiments of the invention can use a passive splitter-combiner. In the case of an optical network, a passive splitter combiner can include two fiber optic couplers. The use of a passive splitter-combiner confers major advantages. There is no need for mechanical or electrical switching. There is no need for fault detection. There is no need for monitoring. There are fewer components compared to an active device. There is no switch to fail. There is no switching time.

The invention can include protecting at least a portion of a network against failure of signal connection lines. For example, given a physical bus, logical ring, each node can be provided with a splitter-combiner. If a signal connection line fails, the splitter-combiner that is RX relative the failed line will switch to detecting signals from the shunt. In this way, at least part of the network can be protected from the affect of the failed line. This can be termed fiber protection.

The splitter-combiners do not have to be located in the same chassis as the data drop/add devices, or even the same nodes. The splitter combiners can be located in-between nodes. Preferred embodiments of the invention use a passive splitter-combiner device to shunt the communications route around the failed line.

Referring to FIG. 2, a physical bus, logical ring is depicted with a first node 210, a second node 220 and a third node 230, each of which includes a data drop/add device 125. FIG. 2 indicates by dashed line segments that additional nodes may be positioned between nodes 220 and 230.

A splitter-combiner 250 is located within each of the nodes 210–230. Each of the splitter-combiners 250 includes a signal splitter 260 and a signal combiner 270 (see the detail numbers relating to the splitter-combiner in the second node 220). The signal combiner 270 is communicatively coupled to the signal splitter 260.

Each of the signal splitters 260 is communicatively coupled to a headend input 262 (see the detail numbers relating to the signal splitter in the third node 230). Each of the signal splitters 260 is communicatively coupled to a downstream output 264.

Each of the signal combiners 270 is communicatively coupled to an upstream input 272 (see the detail numbers relating to the signal combiner in the third node 230). Each of the signal combiners 270 is communicatively coupled to a headend output 274.

The path (connection) between the downstream output 264 and the upstream input 272 can be termed a bypass. The other path, typically a shorter path, between the signal splitter 250 and the signal combiner 260 can be termed a shunt.

In this embodiment, the data drop/add device 125 of each node is communicatively coupled to the headend output 274 of the corresponding signal combiner 270. Data flow is from the signal combiner to the data drop/add device.

By providing the third node 230 with its splitter-combiner, an important expansion feature is enabled. The addition of another node to the third node 230 will be discussed below in more detail with regard to FIG. 3.

The invention can include adding a node to a network without interrupting service to other nodes on the network. For example, given a physical bus, logical ring, the last (terminal) node on the bus can be provided with a splitter-combiner that will initially detect signals from the shut. The additional node would then be connected to the splitter-combiner. The additional node would then be the new terminal node on the physical bus, logical ring. Upon connecting the additional node, the splitter-combiner in what was the terminal node will switch to detecting signals from the bypass. This can be termed non-intrusive expansion.

As above, the splitter-combiners do not have to be located in the same chassis as the data drop/add devices, or even the same nodes. Preferred embodiments of the invention use a passive splitter-combiner device to bypass the communications route to the new terminal node.

Referring to FIG. 3, a fourth node 340, which includes another data drop/add device 125, has been connected to the third node 230. The signal combiner in the fourth node 340 is communicatively connected to the upstream input of the third node 230. Similarly, the signal splitter in the fourth node 340 is communicatively connected to the downstream output of the third node 230.

Of course, additional nodes may be added to the fourth node 340. By providing the fourth node 340 with its splitter-combiner, the feature of non-intrusive expansion is still enabled.

The invention can include protecting at least a portion of a ring network against failure of active equipment. For example, an active equipment device can be isolated from the rest of the network by providing the node with which the active device is associated with a splitter-combiner. If the active device fails, the associated splitter-combiner will switch to detecting the shunt signal, thereby bypassing the failed device. This can be termed active equipment protection.

Again, although it can be advantageous to co-locate the splitter-combiners with the data drop/add devices, the splitter-combiners do not have to be located in the same chassis as the data drop/add devices or even the same nodes. Since active equipment can fail for a number of reasons, notably power failure, preferred embodiments of the invention use a passive splitter-combiner device to shunt the communications route around the failed active device.

Referring to FIG. 5, a ring architecture is shown with a first node 510, a second node 520 and a third node 530, each of which includes a data drop/add device 125. FIG. 5 indicates by dashed line segments that additional nodes may be positioned between nodes 520 and 530.

In this embodiment, the data drop/add device 125 of each node is communicatively coupled to the upstream input 272 of the corresponding signal combiner 270. The data drop/add device 125 of each node is also communicatively coupled to the downstream output 264 of the corresponding signal splitter 260. Data flow is from the downstream output 264 of the corresponding signal splitter 260 to the data drop/add device 125 and then to the upstream input 272 of the corresponding signal combiner 270.

Referring now to FIG. 6, the data drop/add device 125 is depicted in a more detailed manner. The data drop/add device 125 includes an optical receiver 610 (ORX). The optical receiver 610 can be an optical-to-electronic transducer such as a charge-coupled device. Electrical circuit 620 is coupled to the optical receiver 610. An optical transmitter 630 (OTX) is coupled to the circuit 620. The optical transmitter can be an electronic-to-optical transducer such as a laser diode.

The invention can also include combining two or more of fiber protection, non-intrusive expansion, and/or active device protection. To combine these functionalities, two of the splitter-combiners can be joined together to form a combined device. Again, preferred embodiments of the invention use passive splitter-combiners. However, all aspects of the invention can be implemented with active splitter-combiners.

Referring to FIG. 7, a physical bus, logic ring is depicted with a first node 710, a second node 720 and a third node 730, each of which includes a data drop add device 125. Of course, additional nodes may be located between the depicted nodes.

In this embodiment, each of the nodes includes two splitter-combiners 250. By coupling the headend output 274 of the first splitter-combiner to the headend input 262 of the second splitter combiner both of the features of fiber protection and active equipment protection are enabled. By providing the third node 730 with its second splitter-combiner, the feature of non-intrusive expansion is enabled.

The invention can also be included in a kit. The kit can include some, or all, of the components that compose the invention. More specifically, the kit can include the splitter-combiner and other components of the invention. The kit can also include a splicing equipment and supplies for retrofitting existing nodes with the invention. The kit can contain a computer program. The kit can also contain instructions for practicing the invention and apparatus for carrying out the invention. Unless otherwise specified, the components (and apparatus and/or instructions) of the kit can be the same as those used in the invention.

The invention can also utilize data processing methods that transform signals from one state to another. For example, the invention can be combined with instrumentation to obtain state variable information on the detected signal(s) to actuate interconnected discrete hardware elements. For instance, the invention can include monitoring the switching state of the splitter-combiners and reporting their state to the headend for recordation as diagnostic data. Further, the invention can even include measuring the relative signal attenuation between the bypass and shunt to change the split ratio of the signal splitters and/or signal combiners with variable filter, polarizers and/or refractive index devices, thereby lowering detected noise from the shunt during bypass operation while simultaneously maintaining sufficient shut sensitivity to meet the needs of a contingent switching event.

The term approximately, as used herein, is defined as at least close to a given value (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term program or phrase computer program, as used herein, is defined as a sequence of instructions designed for execution on a computer system. A program may include a subroutine, a function, a procedure, an object method, an object implementation, an executable application, an applet, a servlet, a source code, an object code, and/or other sequence of instructions designed for execution on a computer system.

The particular manufacturing process used for fabricating the splitter-combiner should be inexpensive and reproducible. Conveniently, the splitter-combiner of the invention can be fabricated using any splicing method to join two Y branches, either optical or electrical. In the case of optical branches (e.g., tap couplers) it is preferred that the process be an optical butt splicing technique. For the manufacturing operation, it is an advantage to employ a UV light curing, guide tube technique.

However, the particular manufacturing process used for fabricating the splitter-combiner is not essential to the invention as long as it provides the described functionality. Normally those who make or use the invention will select the manufacturing process based upon tooling and energy requirements, the expected application requirements of the final product, and the demands of the overall manufacturing process.

While not being limited to any particular performance indicator or diagnostic identifier, preferred embodiments of the invention can be identified one at a time by testing for the presence of sufficient signal strength differential at the headend output of the splitter-combiner. At the headend output of the splitter-combiner, the difference in relative strength between signal(s) entering the head end input and signal(s) entering the upstream input should be from approximately 10 dB to approximately 20 dB. This difference in relative strength between the signals can be achieved by selecting the tap coupling ratios (split ratios) of the signal splitter and the signal combiner. This difference in relative strength can also be achieved by adjusting the amplitude of signals entering the headend input and the amplitude of signals entering the upstream input. The test for the presence of sufficient signal strength differential can be carried out without undue experimentation by the use of a simple and conventional signal strength meter experiment.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

A physical bus, logical ring, can provide the fiber protection and non-intrusive expansion functionalities where each add/drop (A/D) node includes a splitter-combiner. The splitter-combiner can include a signal splitter where approximately 5% of the signal energy is deflected to the shunt and approximately 95% of the signal energy is directed toward the bypass. Suitable fiber optic couplers with this output port ratio are readily commercially available from E-TEK Dynamics, Inc. (models SWBC and/or SMFC); and Amphenol (part no. 945-271-C100). The splitter-combiner can include a signal combiner where approximately 50% of the combined signal energy is derived from the shunt, and approximately 50% of the combined signal energy is derived from the bypass. Suitable fiber optic couplers are readily commercially available from JDS Fitel (AC Series); E-TEK Dynamics, Inc. (models SWBC and/or SMFC); and Amphenol (part nos. 945-130-1000, 945-131-1000, 945-132-1000, 945-170-1000, 945-171-1000 and/or 945-172-1000).

Example 2

A physical bus, logical ring, can provide the fiber protection and non-intrusive expansion functionalities where each add/drop (A/D) node includes a splitter-combiner. The splitter-combiner can include a signal splitter where approximately 10% of the signal energy is deflected to the shunt and approximately 90% of the signal energy is directed toward the bypass. Suitable fiber optic couplers are readily commercially available from JDS Fitel (AC Series); Amphenol (part nos. 945-130-2000, 945-131-2000, 945-132-2000, 945-170-2000, 945-171-2000 and/or 945-172-2000). The splitter-combiner can include a signal combiner where approximately 10% of the combined signal energy is derived from the shunt, and approximately 90% of the combined signal energy is derived from the bypass.

Example 3

The active equipment functionality can be provided by a ring architecture where each add/drop (A/D) node includes a splitter-combiner. The splitter-combiner can include a signal splitter where approximately 10% of the signal energy is deflected to the shunt and approximately 90% of the signal energy is directed toward the bypass. The splitter-combiner can include a signal combiner where approximately 10% of the combined signal energy is derived from the shunt, and approximately 90% of the combined signal energy is derived from the bypass.

Practical Applications of the Invention

A practical application of the invention that has value within the technological arts is the non-intrusive expansion of communication networks, such as adding a data drop/add node to a logical loop. Further, the invention is useful in conjunction with controlling the spread of damage from failure of passive components in a communications network (such as broken optical fibers and/or severed coaxial cables), or in conjunction with controlling the spread of damage from failure of active components (such as data drop/add nodes and/or repeaters), or the like. There are virtually innumerable uses for the invention, all of which need not be detailed here.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be assembled in the disclosed configuration, but could be assembled in virtually any configuration. Further, the individual components need not be fabricated from the disclosed materials, but could be fabricated from virtually any suitable materials. Further, although the splitter-combiner described herein can be a physically separate module, it will be manifest that the splitter-combiner may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements.

The appended claims are not to be interpreted as including means-plus-function limitations, unless such a limitation is explicitly recited in a given claim using the phrase "means for." Expedient embodiments of the invention are differentiated by the appended subclaims.

What is claimed is:

1. An apparatus, comprising a communications link, said communications link including
    a splitter-combiner communicatively coupled to a headend, said splitter-combiner including:
        a signal splitter communicatively coupled to a headend input and communicatively coupled to a downstream output; and
        signal combiner coupled via a shunt to said signal splitter, communicatively coupled to an upstream input, and communicatively coupled to a headend output; and
    a data drop/add device communicatively coupled to said downstream output and communicatively coupled to said upstream input,
    wherein, if the data drop/add device fails, the splitter-combiner will switch to detecting a shunt signal on the shunt.

2. The apparatus of claim 1, wherein said data drop/add device includes an optical-to-electronic transducer coupled to said downstream output and an electronic-to-optical transducer coupled to said upstream input.

3. The apparatus of claim 1, wherein said splitter-combiner is a passive device.

4. The apparatus of claim 1, further comprising another splitter-combiner communicatively coupled to said headend input and communicatively coupled to said headend.

5. The apparatus of claim 4, further comprising another data drop/add device communicatively coupled to said another splitter-combiner.

6. The apparatus of claim 1, wherein said communications link includes an optical fiber coupled between said splitter-combiner and said headend, said signal splitter includes an optical beam splitter and said signal combiner includes an optical beam combiner.

7. The apparatus of claim 1, wherein said communications link includes a coaxial cable coupled between said splitter-combiner and said headend, said signal splitter includes an electrical splitter circuit and said signal combiner includes an electrical combiner circuit.

8. An apparatus, comprising a communications link, said communications link including
    a first splitter-combiner communicatively coupled to a headend, said first splitter-combiner including:
        a first signal splitter communicatively coupled to a first headend input and communicatively coupled to a first downstream output; and
        a first signal combiner coupled via a shunt to said first signal splitter, communicatively coupled to a first upstream input, and communicatively coupled to a first headend output;
    a data drop/add device communicatively coupled to said first downstream output and communicatively coupled to said first upstream input;
    a second splitter-combiner communicatively coupled between said first headend input and said headend, said second splitter-combiner including:
        a second signal splitter communicatively coupled to said headend and communicatively coupled to a second downstream output; and
        a second signal combiner communicatively coupled to said second signal splitter, communicatively coupled to a second upstream input, and communicatively coupled to said first headend input,
    wherein, if the data drop/add device fails, the first splitter-combiner will switch to detecting a shunt signal on the shunt.

9. The apparatus of claim 8, wherein said data drop/add device includes an optical-to-electronic transducer coupled to said downstream output and an electronic-to-optical transducer coupled to said upstream input.

10. The apparatus of claim 8, wherein both said first splitter-combiner and said second splitter-combiner are passive devices.

11. The apparatus of claim 8, further comprising a third splitter-combiner communicatively coupled to said headend input and communicatively coupled between said second splitter-combiner and said headend.

12. The apparatus of claim 11, further comprising another data drop/add device communicatively coupled to said third splitter-combiner.

13. The apparatus of claim 8, wherein said communications link includes an optical fiber coupled between said first splitter-combiner and said headend, said first signal splitter includes an optical beam splitter and said first signal combiner includes an optical beam combiner.

14. The apparatus of claim 8, wherein said communications link includes a coaxial cable coupled between said first splitter-combiner and said headend, said first signal splitter includes an electrical splitter circuit and said first signal combiner includes an electrical combiner circuit.

15. A method, comprising deploying a communication link, at least a portion of which is protected against active equipment failure, that includes a splitter-combiner communicatively coupled between a data drop/add device and a headend, wherein, if the data drop/add device fails, the splitter-combiner will switch to detecting a shunt signal on a shunt.

16. The method of claim 15,
wherein said splitter-combiner includes:
a signal splitter communicatively coupled to a headend input and communicatively coupled to a downstream output; and
a signal combiner coupled via the shunt to said signal splitter, communicatively coupled to an upstream input, and communicatively coupled to a headend output,
wherein switching results from a communicative decoupling of said upstream input from said downstream output.

17. The method of claim 15, further comprising monitoring a switching state of said splitter-combiner.

18. The method of claim 17, further comprising reporting said switching state to said headend.

19. The method of claim 18, further comprising recording said switching state as diagnostic data.

* * * * *